United States Patent
Haneishi et al.

(10) Patent No.: US 6,725,985 B2
(45) Date of Patent: Apr. 27, 2004

(54) DYNAMIC DAMPER AND PROPELLER SHAFT

(75) Inventors: Kazunobu Haneishi, Tochigi (JP); Katsuhide Sasaki, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 10/238,393

(22) Filed: Sep. 10, 2002

(65) Prior Publication Data

US 2003/0155697 A1 Aug. 21, 2003

(30) Foreign Application Priority Data

Feb. 19, 2002 (JP) ........................ 2002-042378

(51) Int. Cl.[7] .................................. F16F 7/10
(52) U.S. Cl. ........................ 188/379; 464/180
(58) Field of Search ................. 464/180, 183, 464/181, 182; 188/378, 379; 74/574; 267/140.12, 140.13, 140.3, 140.4, 281

(56) References Cited

U.S. PATENT DOCUMENTS

| | | | | |
|---|---|---|---|---|
| 2,621,923 A | * | 12/1952 | Krotz | 267/281 |
| 3,075,406 A | * | 1/1963 | Butler et al. | 74/574 |
| 3,137,148 A | * | 6/1964 | Kayser | 464/89 |
| 3,235,941 A | * | 2/1966 | Krotz | 29/898.04 |
| 3,881,711 A | * | 5/1975 | Lemaitre | 267/282 |
| 4,014,184 A | * | 3/1977 | Stark | 464/180 |
| 4,768,761 A | * | 9/1988 | Kramer | 267/154 |
| 4,909,361 A | * | 3/1990 | Stark et al. | 188/268 |
| 5,326,324 A | * | 7/1994 | Hamada | 464/180 |
| 5,413,374 A | * | 5/1995 | Pierce | 280/124.177 |
| 5,667,204 A | * | 9/1997 | Slocum | 267/136 |
| 5,865,429 A | * | 2/1999 | Gautheron | 267/141.7 |
| 6,241,062 B1 | * | 6/2001 | Enright | 188/378 |
| 6,409,606 B1 | * | 6/2002 | Nakajima et al. | 464/181 |
| 6,517,062 B2 | * | 2/2003 | Kuwayama et al. | 267/140.12 |

* cited by examiner

Primary Examiner—Jack Lavinder
Assistant Examiner—Benjamin A Pezzlo
(74) Attorney, Agent, or Firm—Orum & Roth

(57) ABSTRACT

This invention provides a dynamic damper comprising an outer pipe 20, a weight 30 disposed inside the outer pipe 20 and an elastic body 40 interposed between the outer pipe 20 and the weight 30. The outer pipe 20 contains slit 21 crossing the circumferential direction of the outer pipe 20 and the slit 21 may be filled with elastic filler 50.

10 Claims, 4 Drawing Sheets

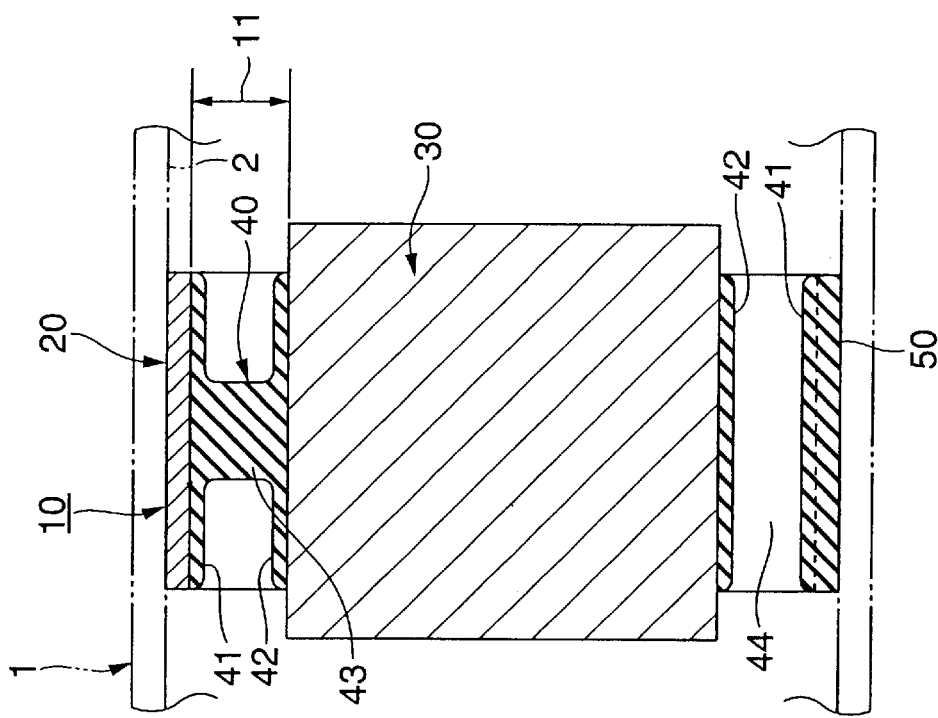
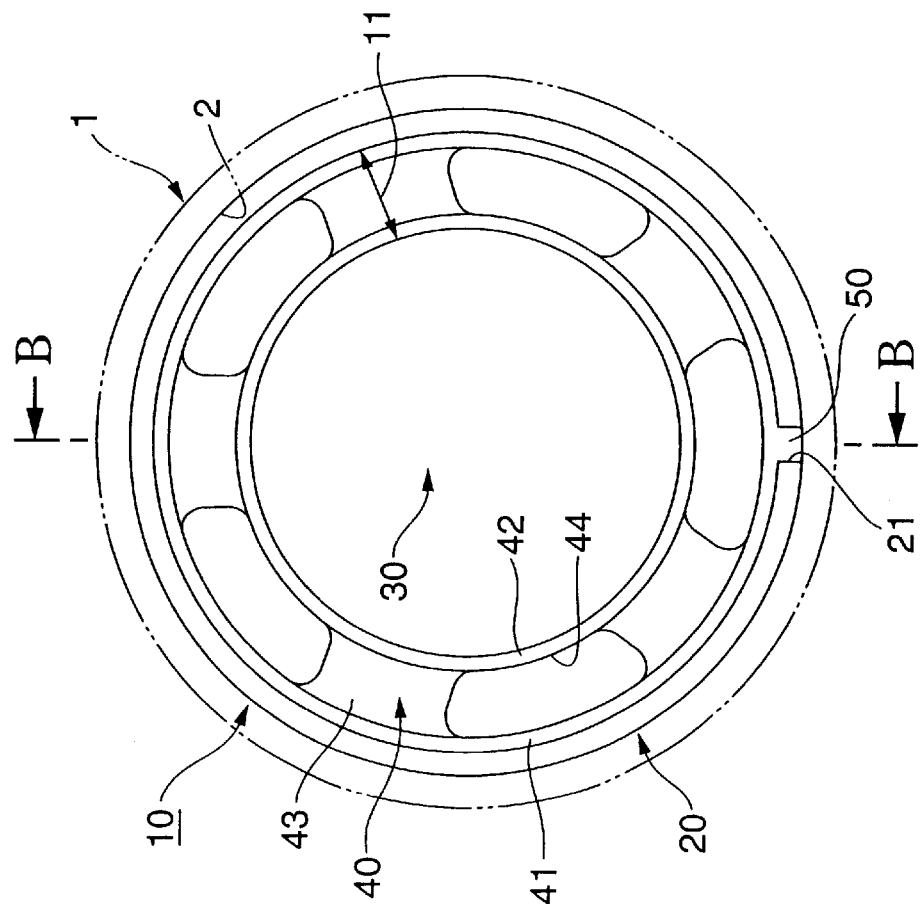
FIG.1A
FIG.1B

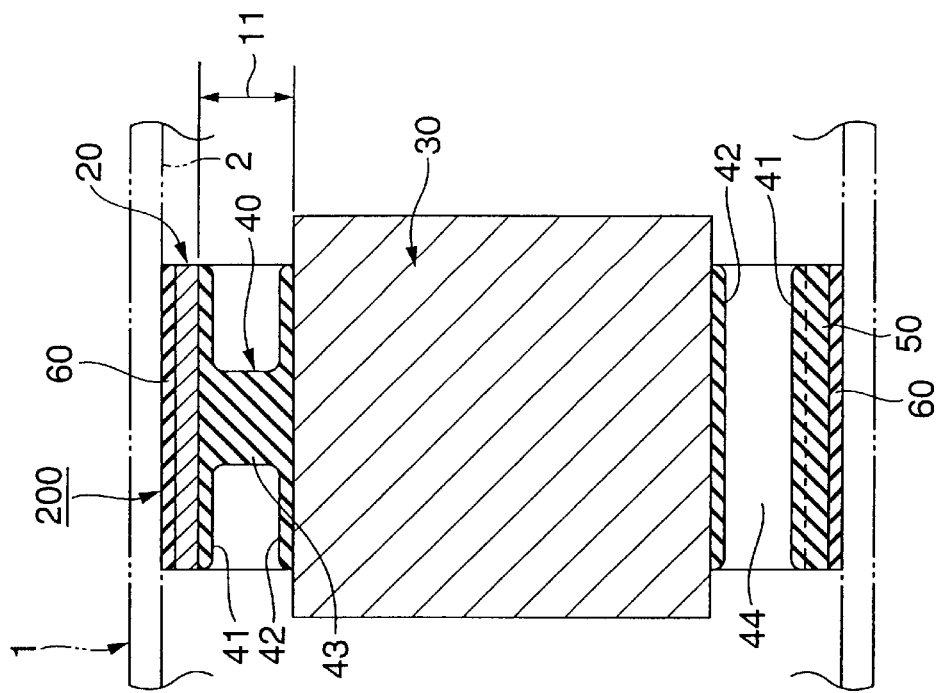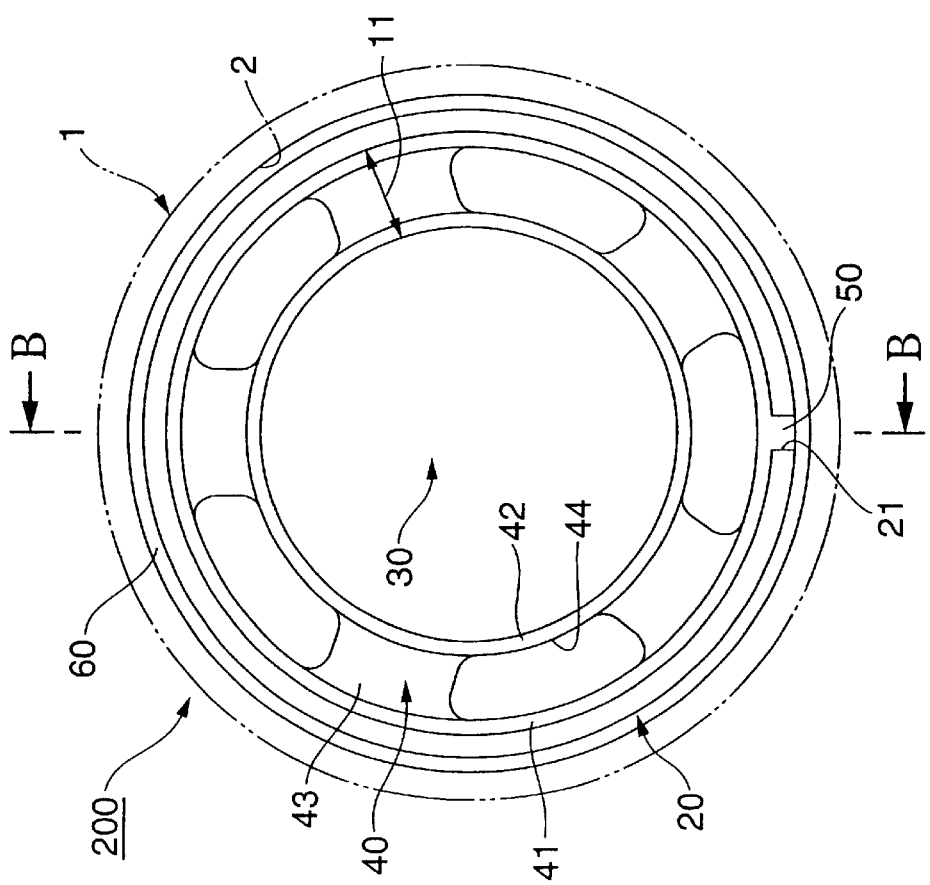

DYNAMIC DAMPER AND PROPELLER SHAFT

BACKGROUND OF THE INVENTION

1. Field of the Invention

The present invention relates to a dynamic damper and a propeller shaft.

2. Description of the Related Art

There are dynamic dampers, which reduce vibration of an automobile driving power transmitting member, such as a propeller shaft, in order to reduce vehicle vibration and mechanical noise. Such dynamic dampers include an outer pipe, a weight disposed inside the outer pipe and an elastic body disposed between the outer pipe and the weight. This dynamic damper is pressed into a hollow shaft constituting the propeller shaft and is fixed thereto.

According to Japanese Utility Model Application Laid-Open No. H4-122843, the outer diameter of the outer pipe under its free state is larger than the inner diameter of the hollow shaft. A slit is provided in the outer pipe perpendicular to the circumferential direction thereof in order to improve ease of pressing the dynamic damper into the hollow shaft of the propeller shaft. Existence of this slit in the outer pipe enables the dynamic damper to be contracted elastically from the free state. Consequently, when the dynamic damper is pressed into the hollow shaft, the outer pipe is contracted from the free state so that the same dynamic damper can be engaged into the hollow shaft easily. After the dynamic damper is pressed into the hollow shaft, the outer pipe generates an elastic restoration force expanding the outer pipe to the free state, so that the outer pipe is fit to an inner face of the hollow shaft.

The conventional technology has the following problems.

(1) The outer pipe is always contracted due to the slit. Therefore, the outer pipe is contracted and deflected by vibration applied to the hollow shaft during use after it is pressed into the hollow pipe, thereby likely deteriorating the initial vibration resistance of the dynamic damper.

(2) To maintain an elastic restoration force for stably expanding the outer pipe from its contraction state to the free state, stiffness of the outer pipe needs to be secured. Therefore, the outer pipe needs to be provided with a thickness higher than a predetermined level. In this case, there is a possibility that within the range of such a limited inner diameter of the hollow shaft, the weight and the elastic body located within the outer pipe may not secure necessary volumes (diameter, thickness). Consequently, the weight of the dynamic damper is increased, thereby deteriorating the easiness of being pressed in.

SUMMARY OF THE INVENTION

An object of the present invention is to press a dynamic damper into a hollow shaft easily, which allows the damper to be fixed thereto stably, and which makes the dynamic damper compact.

According to the present invention, there is disclosed a dynamic damper comprising an outer pipe, a weight disposed inside the outer pipe and an elastic body interposed between the outer pipe and the weight.

The outer pipe contains at least one slit crossing circumferential direction of the outer pipe, and the slit is filled with elastic filler.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

FIGS. 1A and 1B show a dynamic damper of the first embodiment, while FIG. 1A is a front view thereof and FIG. 1B is a sectional view taken along the line B—B;

FIGS. 3A and 3B show a dynamic damper of the third embodiment, while FIG. 3A is a front view thereof and FIG. 3B is a sectional view taken along the line B—B.

Figure 2:
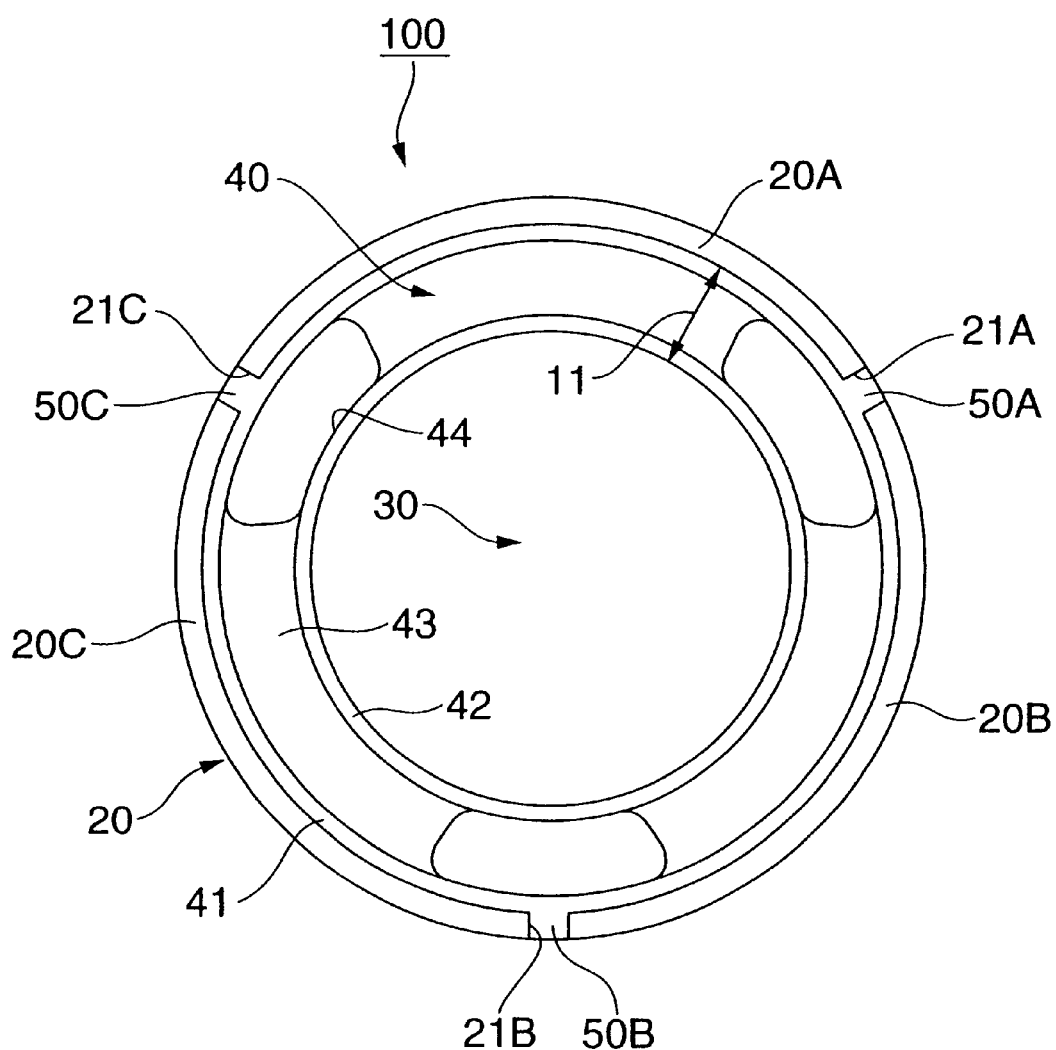
FIG. 2 is a front view showing a dynamic damper of the second embodiment.

DESCRIPTION OF THE PREFERRED EMBODIMENTS (First Embodiment)

Reference numeral 10 in FIGS. 1A and 1B denotes a dynamic damper 10, which is pressed into a hollow shaft 2 of an automobile propeller shaft 1 and is disposed at a predetermined position thereof in the axial direction. The dynamic damper 10 reduces vibration of the propeller shaft 1 so as to reduce vehicle body vibration and mechanical noise.

The dynamic damper 10 comprises an outer pipe 20, a weight 30 and an elastic body 40.

The outer pipe 20 is a cylindrical pipe, which is produced by winding a metallic plate such as spring steel or a metallic pipe of steel or the like. The outer pipe 20 is not a complete cylinder but has a C-shaped section having a slit 21 crossing the circumferential direction, thereby maintaining the outside diameter in a free state larger than the inside diameter of the hollow shaft 2. The existence of the slit 21 enables the outside diameter of the outer pipe 20 to be contracted elastically from its free state.

The weight 30 is a cylindrical short column, made of a metallic bar of steel rod or the like. The weight 30 is disposed inside the outer pipe 20 coaxially with the same outer pipe 20. The weight 30 is wider than the outer pipe 20 (see FIG. 1B).

The elastic body 40 is disposed within an annular space 11 between the outer pipe 20 and the weight 30. Also, the elastic body 40 is constituted of an outer peripheral layer 41 bonded to the inner face of the outer pipe 20, an inner peripheral layer 42 bonded to the outer face of the weight 30 and an elastic interposed portion 43 provided at a plurality of circumferential positions (5 positions in this embodiment) between the outer peripheral layer 41 and the inner peripheral layer 42. The outer peripheral layer 41 and the inner peripheral layer 42 have the same width as the outer pipe 20. The elastic interposed portion 43 is narrower than the outer peripheral layer 41 and the inner peripheral layer 42, and is erected in the center in the width direction of the each of the outer peripheral layer 41 and the inner peripheral layer 42. The elastic body 40 contains through hollow portions 44 each provided between the adjacent elastic interposed portions 43 and 43. The elastic body 40 is formed of vulcanized synthetic rubber or the like with respect to the outer pipe 20 and the weight 30.

In this dynamic damper 10, the slit 21 in the outer pipe 20 is filled with elastic filler 50 made of synthetic rubber or the like. The elastic filler 50 is formed integrally with the elastic body 40 and is connected to the outer peripheral layer 41 at a position corresponding to the hollow portion 44. The dynamic damper 10 is formed by pouring rubber into a mold in which the outer pipe 20 and the weight 30 are disposed so as to form the elastic body 40 and the elastic filler 50 integrally by vulcanization.

This embodiment ensures the following operations.

(1) In this dynamic damper 10, the slit 21 of the outer pipe 20 is filled with elastic filler 50. Therefore, when pressed into the hollow shaft 2, the outer pipe 20 is contracted from the free state by compressing the elastic filler 50 in the slit 21 of the outer pipe 20, so that it is engaged inside the hollow shaft 2 easily. In a usage condition after being pressed into the hollow shaft 2, the outer pipe 20 gain an elastic reaction force to the compression of the elastic filler 50, as well as the elastic restoration force expanding the outer pipe 20 to the free state, so as to exert a strong expanding characteristic entirely in the circumferential direction including the gap in the slit. Consequently, the dynamic damper 10 is fit firmly to the inner face of the hollow shaft due to the strong expanding characteristic of the outer pipe 20, and is fixed stably to the hollow shaft 2 without being deflected by vibration or other force applied to the hollow shaft 2. As a result, the initial vibration resistance is stably maintained.

(2) The outer pipe 20 can secure a strong expanding characteristic by receiving the reaction force of the compression of the elastic filler 50. Therefore, the outer pipe 20 does not have to be especially thicker so as to secure the elastic restoration force of the outer pipe 20. Because the outer pipe 20 can be thinned, the weight 30 and elastic body 40 in the outer pipe 20 can secure necessary volumes (diameter, thickness) within the range of the limited inside diameter of the hollow shaft 2. Thus, a vibration characteristic setting range is increased, and the dynamic damper 10 can be light and compact.

(3) Because the slit 21 of the outer pipe 20 is provided at a position corresponding to the hollow portion 44 of the elastic body 40, the existence of the slit 21 in the dynamic damper 10 eliminates a bad influence upon the vibration resistance.

(4) In the dynamic damper 10, the elastic filler 50 is formed integrally with the elastic body 40. Therefore, at the same time when the elastic body 40 is formed between the outer pipe 20 and the weight 30, the elastic filler 50 can be loaded, thereby facilitating the production.

(5) The aforementioned (1) to (4) are achieved in the propeller shaft 1, so that the dynamic damper 10 is pressed into the hollow shaft 2 easily and is fixed stably, and a compact configuration is achieved.

(Second Embodiment) (FIG. 2)

The dynamic damper 100 of FIG. 2 is substantially different from the dynamic damper 10 in that the outer pipe 20 is divided to n (n is an integer 2 or more) in the circumferential direction (preferably, divided to n at an equal distance (360 degrees/n)) and that according to this embodiment, the outer pipe 20 is comprised of divided portions 20A to 20C (preferably, divided to three at an equal distance (120 degrees distance)). Slits 21A to 21C, crossing the outer pipe 20 in the circumferential direction, are provided at abutting portions of the adjacent divided portions 20A to 20C. The respective slits 21A to 21C are filled with elastic filler 50A to 50C integral with the elastic body 40. According to this embodiment, elastic interposed portions 43 are provided at three positions in the circumferential direction of the elastic body 40, and elastic fillers 50A to 50C are provided at positions corresponding to hollow portions 44.

(Third Embodiment)(FIGS. 3A and 3B)

The dynamic damper 200 of FIGS. 3A and 3B is substantially different from the dynamic damper 10 in that the outer circumferences of the outer pipe 20 and the elastic filler 50 are covered with elastic covering material 60 composed of synthetic rubber or the like. The elastic covering material 60 may be formed integrally with the elastic filler 50.

In the dynamic damper 200, easiness of the pressure-fitting of the outer pipe 20 into the hollow shaft 2 is also secured by elastic deformation of the elastic covering material 60 mounted on the outer circumference of the outer pipe 20. The elastic covering material 60 is fit firmly to the inner face of the hollow shaft 2 because of back-up by the expanding characteristic of the outer pipe 20.

Figure 4:
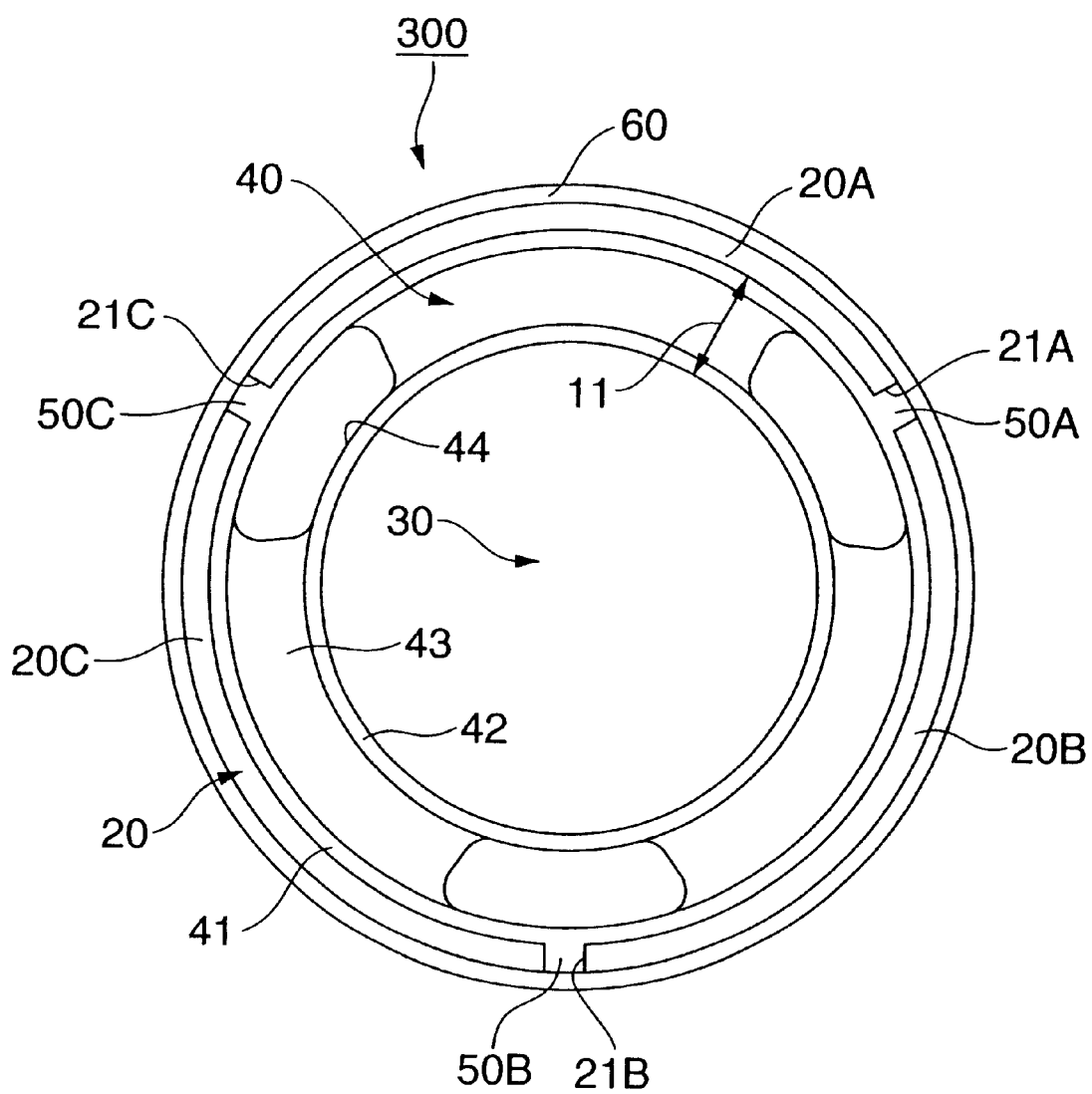
FIG. 4 is a front view showing a dynamic damper of the fourth embodiment.

(Fourth Embodiment) (FIG. 4)

The dynamic damper 300 of FIG. 4 is substantially different from the dynamic damper 200 in that the outer pipe 20 is comprised of divided portions 20A to 20C created by dividing the outer pipe 20 into three sections. The slits 21A to 21C crossing the circumferential direction of the outer pipe 20 are provided at abutting portions of adjacent divided portions 20A to 20C. The elastic body 40 and/or the elastic covering member 60 integral with the elastic filler 50A to 50C is loaded in each of the respective slits 21A to 21C. According to this embodiment, the elastic interposed portions 43 are erected at three positions in the circumferential direction of the elastic body 40, and the slits 21A to 21C are provided at positions corresponding to the hollow portions 44.

As heretofore explained, embodiments of the present invention have been described in detail with reference to the drawings. However, the specific configurations of the present invention are not limited to the embodiments but those having a modification of the design within the range of the present invention are also included in the present invention. For example, the elastic filler may not always be formed integrally with the elastic body but may be formed separately and installed to the outer pipe later. Further, the dynamic damper of the present invention is applicable to a driving power transmitting member other than a propeller shaft.

As described above, the present invention enables the dynamic damper to be pressed into the hollow shaft easily, fixed thereto stably and constructed in a compact structure.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A dynamic damper comprising an outer pipe, a weight disposed inside the outer pipe and an elastic body interposed between the outer pipe and the weight, wherein the outer pipe contains at least one axial slit extending the length of the outer pipe and the slit is filled with elastic filler wherein the elastic body is disposed in an annular space between the outer pipe and the weight, comprises elastic interposed portions being provided at a plurality of positions in the circumferential direction of the annular space, said elastic body having at least one hollow portion being formed between adjacent elastic interposed portions, and the slit being provided at a position corresponding to each hollow portion.

2. The dynamic damper according to claim 1 wherein the elastic filler is formed integrally with the elastic body.

3. The dynamic damper according to claim 1 wherein the outer circumference of the outer pipe is covered with elastic covering material.

4. The dynamic damper according to claim 2 wherein the outer circumference of the outer pipe is covered with elastic covering material.

5. The dynamic damper according to claim 1 wherein the outer pipe comprises divided portions arranged by dividing the outer pipe into a plurality of sections in the circumferential direction, and a plurality of axial slits, the slits being provided at abutting portions of adjacent divided portions.

6. A propeller shaft wherein the dynamic damper according claim 1 is pressed into and fixed to a hollow shaft.

7. A propeller shaft wherein the dynamic damper according claim 3 is pressed into and fixed to a hollow shaft.

8. A propeller shaft wherein the dynamic damper according claim 3 is pressed into and fixed to a hollow shaft.

9. A propeller shaft wherein the dynamic damper according claim 4 is pressed into and fixed to a hollow shaft.

10. A propeller shaft wherein the dynamic damper according claim 5 is pressed into and fixed to a hollow shaft.

* * * * *